US00RE40492E

(19) United States
(12) Reissued Patent
Grimes et al.

(10) Patent Number: US RE40,492 E
(45) Date of Reissued Patent: Sep. 9, 2008

(54) POWER LINE TELEPHONY EXCHANGE

(75) Inventors: David W. Grimes, deceased, late of Oxford, MD (US); by Suzanne H. Grimes, legal representative, Oxford, MD (US)

(73) Assignee: Telkonet Communications, Inc., Annapolis, MD (US)

(21) Appl. No.: 11/170,705

(22) Filed: Jun. 30, 2005

Related U.S. Patent Documents

Reissue of:
(64) Patent No.: 6,668,058
Issued: Dec. 23, 2003
Appl. No.: 09/799,599
Filed: Mar. 7, 2001

U.S. Applications:
(63) Continuation-in-part of application No. 09/781,346, filed on Feb. 12, 2001, now abandoned.
(60) Provisional application No. 60/187,394, filed on Mar. 7, 2000, and provisional application No. 60/181,519, filed on Feb. 10, 2000.

(51) Int. Cl.
*H04M 3/00* (2006.01)
*H04M 5/00* (2006.01)
*H04M 7/00* (2006.01)

(52) U.S. Cl. ..... 379/322; 379/333
(58) Field of Classification Search ..... 379/322–324, 379/333; 370/352, 422; 340/310.01, 425.1, 340/425.2; 375/222
See application file for complete search history.

(56) References Cited

U.S. PATENT DOCUMENTS

| | | | |
|---|---|---|---|
| 3,771,069 | A | 11/1973 | Levacher |
| 3,846,638 | A | 11/1974 | Wetherell |
| 3,924,223 | A | 12/1975 | Whyte |
| 4,130,861 | A | 12/1978 | LaForest |
| 4,142,178 | A | 2/1979 | Whyte |
| 4,188,619 | A | 2/1980 | Perkins |
| 4,417,207 | A | 11/1983 | Sato |
| 4,429,299 | A | 1/1984 | Kabat |
| 4,602,240 | A | 7/1986 | Perkins |
| 4,622,535 | A | 11/1986 | Ise |
| 4,636,771 | A | 1/1987 | Ochs |
| 4,644,320 | A | 2/1987 | Carr et al. |

(Continued)

FOREIGN PATENT DOCUMENTS

| | | | |
|---|---|---|---|
| EP | 0 756 785 | B2 | 7/1998 |
| JP | 362274829 | A | 11/1987 |
| JP | 5145450 | A | 6/1993 |
| JP | 405316000 | A | 11/1993 |
| WO | WO 00/07304 | | 6/2000 |
| WO | WO 01/67630 | | 9/2001 |

*Primary Examiner*—Benny Q. Tieu
(74) *Attorney, Agent, or Firm*—The Nath Law Group; Gary M. Nath; Burman Y. Mathis

(57) ABSTRACT

Method steps and component combinations for establishing a telephony exchange, with benefits of hardwiring, free of a requirement for first installing telephone copper wire service to a concentration of electric power consumers. An operations center for the telephony exchange provides worldwide access by means of a public-switched telephone network and an Internet service provider. Communications received are converted to packetized data signals which are routed for sorting at a transformer service unit (TSU) for electrical power-line transfer with the output of a local transformer. The consumer voltage level transformer output is reactance coupled by the transformer service unit (TSU) to transfer packetized data signals, with transformer output electrical power to a plurality of subscriber service units (SSU's) served by the TSU. Each SSU sorts packetized data signals for an individual subscriber, selectively providing for plain old telephone service, digital phone service, and worldwide Internet service.

10 Claims, 4 Drawing Sheets

U.S. PATENT DOCUMENTS 4,675,648 A 6/1987 Roth et al.
4,772,870 A 9/1988 Reyes
4,815,106 A 3/1989 Propp
4,835,517 A 5/1989 van der Gracht et al.
4,845,466 A 7/1989 Hariton
5,066,939 A 11/1991 Mansfield
5,101,191 A 3/1992 MacFayden
5,206,777 A 4/1993 Clarey et al.
5,210,519 A 5/1993 Moore
5,257,006 A 10/1993 Graham et al.
5,351,272 A 9/1994 Abraham
5,369,356 A 11/1994 Kinney
5,394,402 A 2/1995 Ross
5,406,249 A 4/1995 Pettus
5,491,463 A 2/1996 Sargeant
5,559,377 A 9/1996 Abraham
5,592,482 A 1/1997 Abraham
5,623,542 A 4/1997 Schneider et al.
5,684,450 A 11/1997 Brown
5,684,826 A 11/1997 Ratner
5,717,685 A 2/1998 Abraham
5,740,175 A 4/1998 Wakeman
5,774,526 A 6/1998 Propp
5,805,053 A 9/1998 Patel et al.
5,818,127 A 10/1998 Abraham
5,828,293 A 10/1998 Rickard
5,864,284 A 1/1999 Sanderson
5,903,553 A 5/1999 Sakamoto
5,929,749 A 7/1999 Slonim
5,929,750 A 7/1999 Brown
5,933,071 A 8/1999 Brown
5,933,073 A 8/1999 Shuey
5,949,327 A 9/1999 Brown
5,977,650 A 11/1999 Rickard
5,978,371 A 11/1999 Mason, Jr. et al.
5,994,998 A 11/1999 Fisher et al.
6,005,477 A 12/1999 Deck
6,014,386 A 1/2000 Abraham
6,023,106 A 2/2000 Abraham
6,037,678 A 3/2000 Rickard
6,040,759 A 3/2000 Sanderson
6,091,722 A 7/2000 Russell et al. ..... 370/352
6,104,707 A 8/2000 Abraham
6,115,429 A 9/2000 Huang
6,130,896 A 10/2000 Lueker
6,144,292 A 11/2000 Brown
6,172,597 B1 1/2001 Brown
6,205,495 B1 3/2001 Gilbert
6,252,503 B1 6/2001 Berger
6,252,952 B1 6/2001 Kung
6,255,935 B1 7/2001 Lehmann
6,272,551 B1 8/2001 Martin et al.
6,282,405 B1 8/2001 Brown
6,288,631 B1 9/2001 Shinozaki
6,297,730 B1 10/2001 Dickinson
6,384,580 B1 5/2002 Ochoa et al.
6,396,392 B1 5/2002 Abraham
6,396,841 B1 5/2002 Co
6,404,348 B1 6/2002 Wilfong
6,404,773 B1 6/2002 Williams
6,407,987 B1 6/2002 Abraham
6,417,762 B1 7/2002 Comer
6,480,748 B1 11/2002 Gerszberg
6,483,870 B1 11/2002 Locklear
6,504,851 B1 1/2003 Abler
6,510,152 B1 * 1/2003 Gerszberg et al. ..... 370/352
6,560,234 B1 5/2003 Ben-Michael
6,590,493 B1 7/2003 Rasimas
6,614,326 B2 9/2003 Merriman et al.
6,686,832 B2 2/2004 Abraham
6,714,534 B1 * 3/2004 Gerszberg et al. ..... 370/352
6,741,439 B2 5/2004 Parlee
6,756,776 B2 6/2004 Perkinson
6,809,633 B2 10/2004 Cern
6,842,668 B2 1/2005 Carson
6,885,674 B2 4/2005 Hunt
6,950,567 B2 9/2005 Kline
6,958,680 B2 10/2005 Kline
6,975,212 B2 12/2005 Crenshaw et al.
2002/0075097 A1 6/2002 Brown
2002/0186699 A1 12/2002 Kwok
2003/0016631 A1 1/2003 Piner

* cited by examiner

POWER LINE TELEPHONY EXCHANGE

Matter enclosed in heavy brackets [ ] appears in the original patent but forms no part of this reissue specification; matter printed in italics indicates the additions made by reissue.

*More than one reissue application has been filed concurrently herewith for the reissue of U.S. Pat. No. 6,668,058. This is a divisional reissue of U.S. Pat. No. 6,668,058. One of the other applications is a divisional reissue of U.S. Pat. No. 6,668,058 and the other application is a reissue of U.S. Pat. No. 6,668,058.* This application claims the priority of U.S. Provisional Patent Application Ser. No. 60/187,394 filed Mar. 7, 2000, and is a continuation-in-part of U.S. patent application Ser. No. 09/781,346, entitled METHODS AND APPARATUS FOR PROVIDING COMMUNICATION SERVICES, filed Feb. 12, 2001, *which claims priority to U.S. Provisional Patent Application Ser. No. 60/181,519 filed Feb. 10, 2000.*

INTRODUCTION

This invention relates to methods and apparatus for establishing a telephony exchange for multiple potential users within a designated area, free of a requirement for first installing a hardwired telephone line, cable, fiberoptic or other physical connection, for such users. More particularly, this invention is concerned with utilization of an electrical power grid, for a concentration of electrical power consumers, and use of existing consumer power lines to provide for worldwide voice and data telephony exchange.

OBJECTS OF THE INVENTION

A primary objective is providing hardwired voice and digital data communication, for potential telephony exchange subscribers, where no such service previously existed, free of a requirement to first install a hardwired telephone line to such users.

A related object is to provide receiving and sending capabilities for both voice and digital data to subscribers of a telephony exchange, established free of a requirement to first install telephone copper wire, or other dedicated physical carrier, extending to each such subscriber.

Another objective is to provide the advantages of a hardwired telephony exchange for local subscribers, free of a long-established prerequisite to install a new physical telephone linkage to such subscribers.

A specific objective is to enable use of existing electrical power lines to premises of consumers as a physical linkage for providing both voice and digital data services for potential consumer subscribers.

A further object is to adapt electronic technology for sorting voice and data, for controlling priority of voice and digital data transfers, for encoding packetized data signals for delivery to individual telephone exchange subscribers, and for enabling use of existing electrical power lines to consumer premises for sending and receiving such communications.

The above and other objects, contributions and advantages of the invention are described in more detail with references to the accompanying drawings.

DETAILED DESCRIPTION

Needs persist worldwide for hardwired telephony exchange service in areas of advanced industrialized nations and advancing industrialized nations. Problems which have avoided resolution in fulfilling those needs have been found to be at least partially due to longstanding construction practices in certain areas which, previously, made installing a hardwired telephony exchange difficult and costly, while other developing telecommunication technologies confront serious difficulties in such areas.

Hardwired voice and digital data services are also lacking within industrial sites, and in other multiple user complexes in the above-mentioned areas. Present concepts not only make hardwired telephony exchange available in such areas but, also, cost effective.

Telephony exchange methods combined with electrical and electronic technologies by the invention enable safe adaptation of existing electrical power grid structures for a concentration of electrical power consumers, for power-line telephony exchange services, including voice and digital data. The physical linkage telephony exchange provided by present teachings eliminates an initial requirement to install a new physical linkage to premises of potential telephony subscribers. Solid-state and electrical technologies, combined as taught herein, enable utilizing existing electrical power lines: (i) to control digital signal exchange, (ii) to provide for routing packetized voice communications, (iii) to provide access to the World Wide Web, and (iv) to provide for routing digital data.

Figure 1:
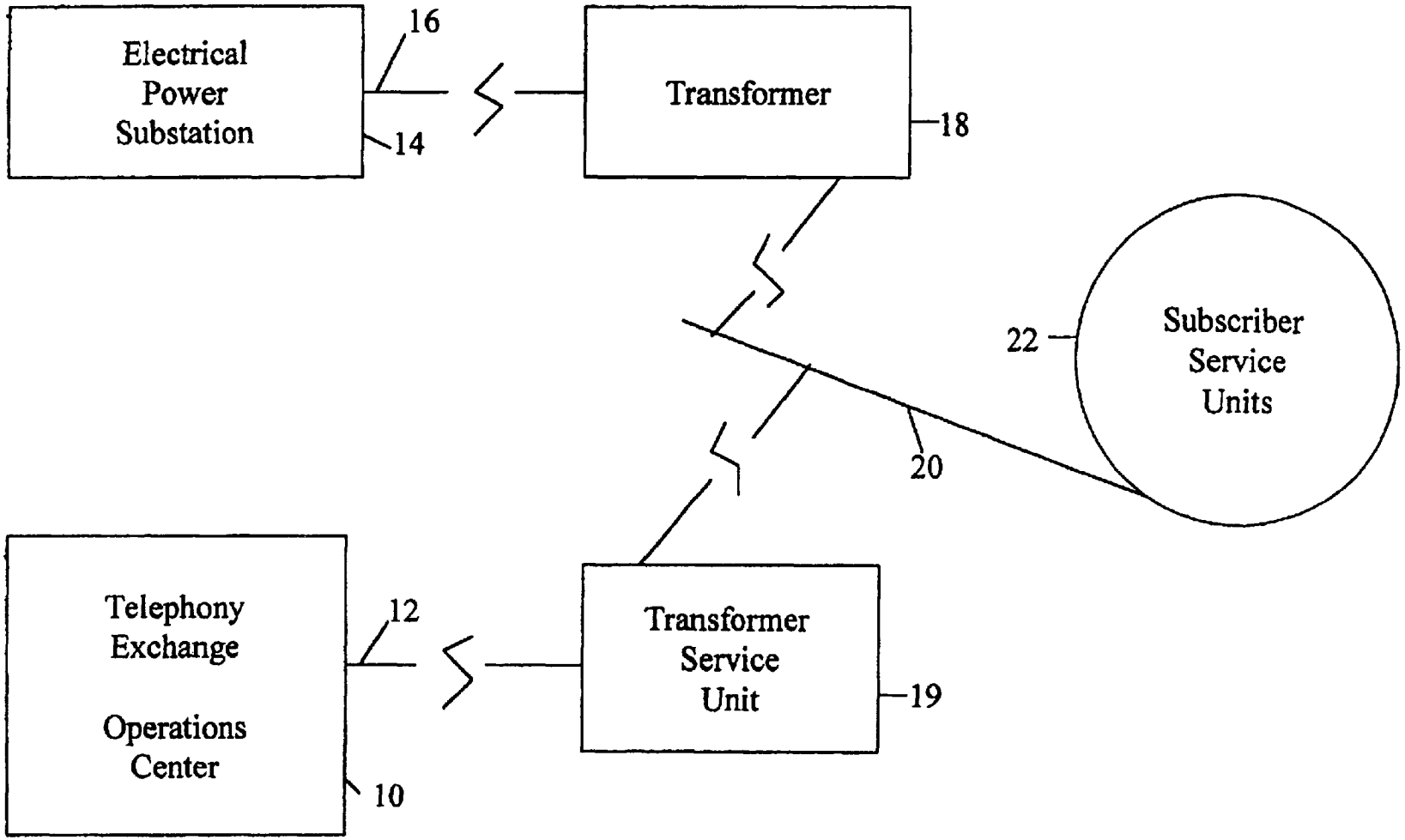
FIG. 1 is a schematic general-arrangement of a power-line telephony exchange for describing the invention.

In the general-arrangement view of FIG. 1, incoming communications are converted at operations center 10 into packetized data signals (also referred to as packets) for transfer by carrier line 12. The latter can take the form of an E-1 carrier as used in Europe and elsewhere, or a T-1 carrier as used in North America. Such packets include header information for routing purposes.

Electrical power is provided by a public utility substation 14 over power line 16 at a voltage level, prior to transforming, which is greater than that used at premises of most electrical power consumers. A local power transformer 18 transforms the higher voltage level of line 16 to a consumer voltage level. Transformer 18 which provides consumer electrical power is reactance coupled with transformer service unit 19. Transformer service units (TSU's) are shown schematically in FIG. 2 and a TSU is described in more detail in relation to FIG. 3, including reactance coupling to a respective transformer for power-line telephony purposes.

Power line 16 and carrier line 12 (FIG. 1) are separate, but can be coextensive in reaching a selected location for the above-mentioned coupling. Carrier line 12 extends to transformer service unit (TSU) 19 and power line 16 extends to transformer 18 in FIG. 1, as depicted schematically in FIG. 1 and shown in more detail in FIG. 3 in which transformer 18 and TSU 19 are reactance coupled.

As a result of such reactance coupling, line 20 of FIG. 1 carries both electrical power at consumer voltage level and packetized data signals to subscriber service units of loop 22. As shown schematically in FIG. 2, each such combination of a transformer and a TSU serves a plurality of telephony exchange subscribers; an individual subscriber service unit is shown by, and described in more detail in relation to, FIG. 4.

Figure 2:
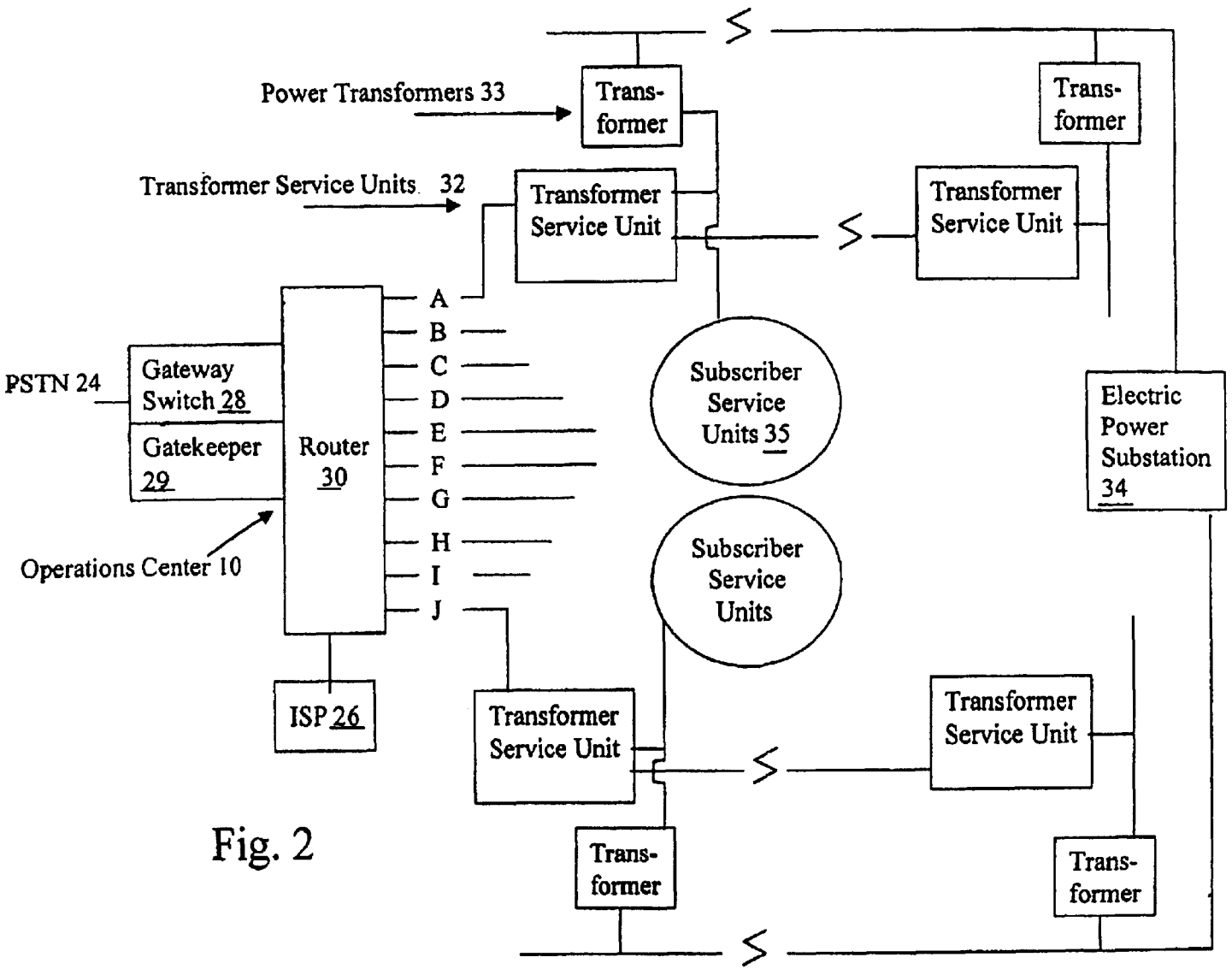
FIG. 2 is a schematic presentation of a power-line telephony exchange layout pattern for describing distribution of telephony exchange services of the invention to a plurality of subscribers concentrated within such pattern.

FIG. 2 presents a more detailed layout with telephony exchange operations center 10 providing worldwide access by means of public-switched telephone network (PSTN) 24, and with Internet service provider (ISP) access at 26. Gateway 28 processes digital telephone signals, forming packetized data packets at about a ten-to-one reduction ratio, which increases capacity and efficiency.

Gatekeeper 29 selects the optimum traffic path for such packets to respective end-user subscribers by initially making a sorting selection, based on the header information of a packet. Router 30 sorts, based on that header information, with router output to a selected carrier from those designated "A" through "J" in FIG. 2.

The power-line telephony exchange embodiment partially shown schematically in FIG. 2 is laid out to be capable of serving ten thousand (10,000) potential telephony subscribers. Each of the potential router selections (A through J) is laid out to include ten transformer service units (TSU's) located along the direction indicated by arrow 32. Each such TSU is powered by its respective power transformer; such transformers are disposed along a direction indicated by arrow 33, with one such transformer being positioned for its respective TSU.

Ten transformers and ten TSU's exist along schematically represented telephony exchange paths, A through J of FIG. 2, providing a system of one hundred (100) individual local transformers and one hundred (100) transformer service units.

Figure 4:
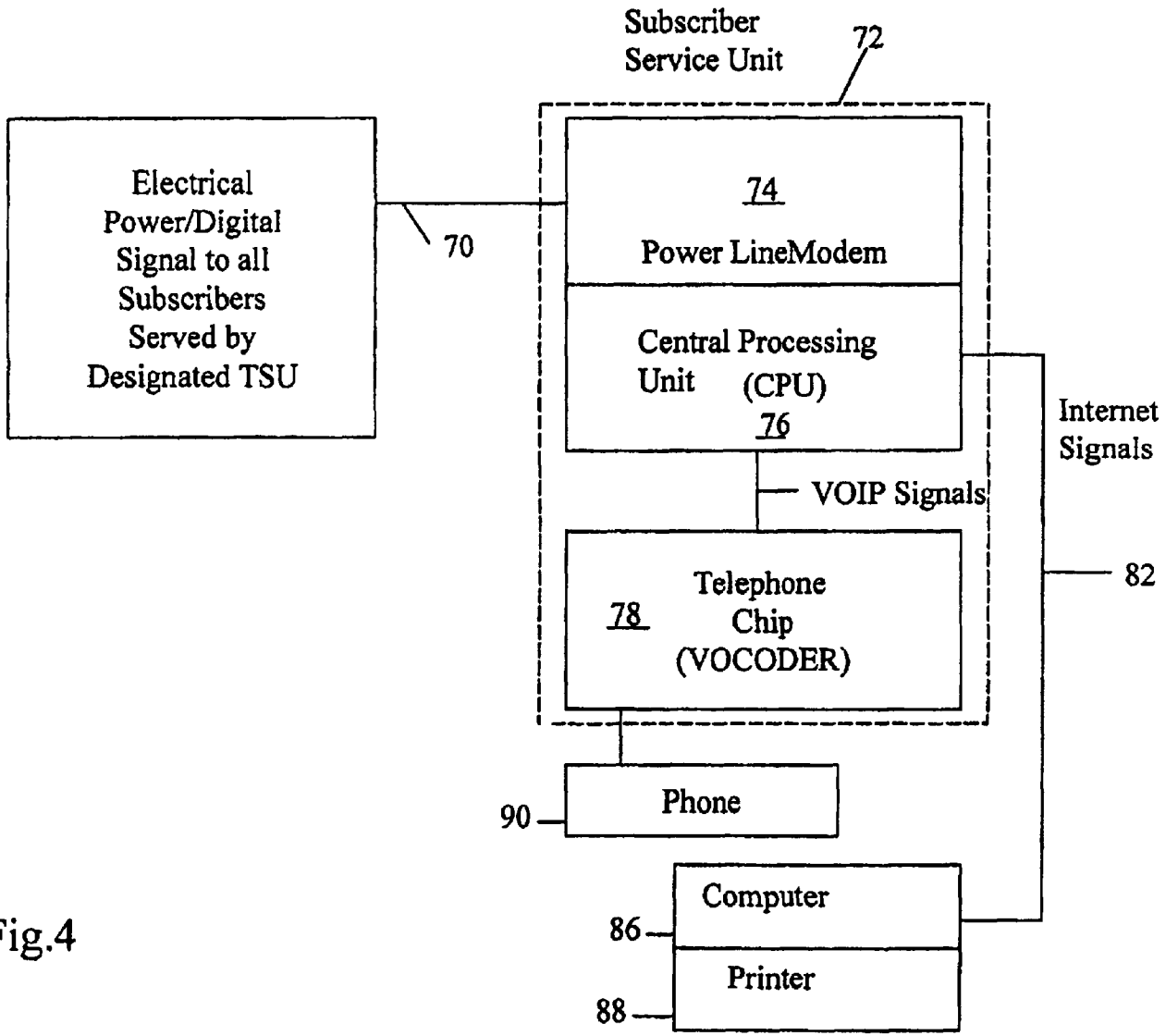
FIG. 4 is a diagrammatic presentation of components, as combined for providing selective communication services to an electrical power consumer telephony exchange subscriber, for describing functions of those components in the power-line telephony exchange of the invention.

One or more electrical power substations, such as 34 in FIG. 2, can be used. A power station directs power at a higher voltage level, to an individual local transformer, than is used within the premises of electrical consumers of a local transformer; and, each respective local transformer provides electrical power at a consumer voltage level to multiple subscribers, such as represented by loop 35 in FIG. 2, with each subscriber having a subscriber service unit, as shown in FIG. 4.

Centrally-located villages or groupings of residences, which have electrical power service but no central hardwired telephone service, utilize the embodiment shown schematically in FIG. 2. However, the numerical size for a power-line telephony exchange of the invention is also adaptable, for example, to use within an industrial site, where electrical power lines can extend to a lesser number, such as one thousand (1000) work stations and/or offices. Communication can be readily coordinated by the telephony exchange of the invention, and can extend to an existing power outlet at each such location; and that can be accomplished free of a requirement to first install a new telephone line to each such location. Voice phone and/or personal computer services can be made available at each such location, in accordance with present teachings.

One criterion for determining a limitation, if any, for a single telephony exchange of the invention is a time-lag factor (latency) of the exchange, which is dependent on the number of transactions in the exchange; a nominal delay of fifty (50) milliseconds has been selected for achieving optimum communications for a single telephony exchange of the invention.

As taught herein, differing electrical power substations can serve local transformers for electric power consumers within a single power-line telephony exchange. The preferred location for is within about a half-mile radius of each transformer/transformer service unit; that radius is selected for purposes of maintaining desired signal strength, without relying on supplementary transponders/repeaters.

Referring to the combination of FIG. 2, certain individual components of such exchange can be ordered for manufacture commercially to specifications determined by the size of the telephony exchange, as follows:

TABLE I

| COMPONENT | MANUFACTURER |
|---|---|
| Gateway Switch 28 | Nuera<br>San Diego, CA 92121 |
| Gatekeeper 29 | Nuera<br>San Diego, CA 92121 |
| Router 30 | CISCO Systems, Inc.<br>San Jose, CA 95134 |

Also, as taught herein, in the event a "right-of-way" is not available for an E-1 or T-1 packetized data line between in-line sequential transformer service units of FIG. 2, a point-to-point radio frequency microwave system can be adapted to use between such transformer service units in the power-line telephony exchange of the invention. RF microwaves in the Ku/X band are currently preferred.

Figure 3:
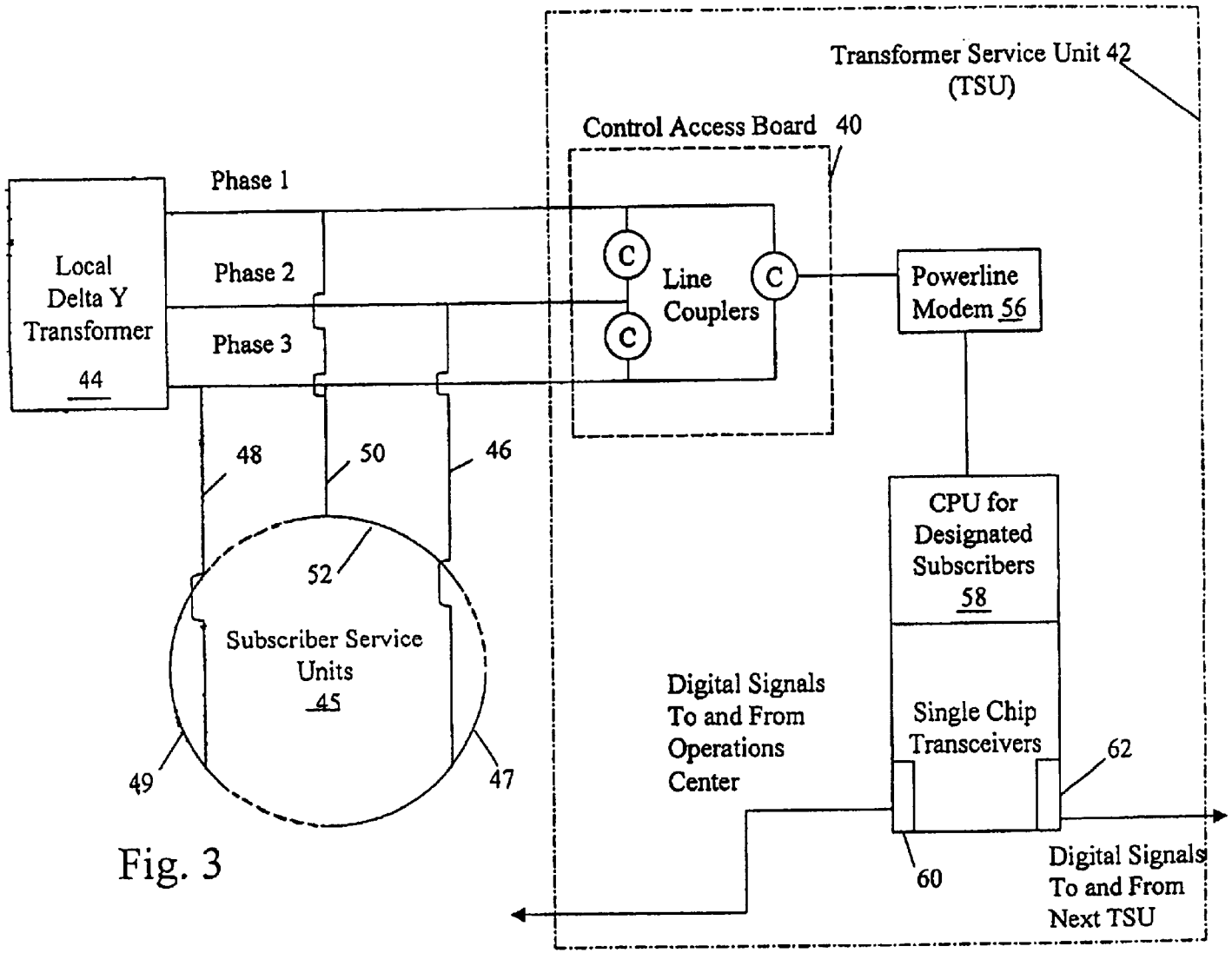
FIG. 3 is a diagrammatic presentation of components as combined for coaction with a local transformer enabling use of a consumer electrical power line to provide telephony exchange services to a plurality of subscribers, and for describing functions of those components in the power-line telephony exchange of the invention.

In FIG. 3, reactance line couplers within control access board 40 couple remaining components of transformer service unit (TSU) interrupted line 42 to local three-phase transformer 44. As shown, three reactance couplers are provided within access control board 40, one for coupling each low (transoformed) voltage phase line of the three-phase transformer 44 to enable power-line transfer of both consumer electrical pwoer and packetized data pokets.

In areas where each residence is served by single-phase electricity, a three-phase transformer enables increasing the number of subscriber units served in a loop such as 45 of FIG. 3. For example, That is, transformer low voltage line 46 delivers electrical power and packetized data signals to thirty-four subscriber service units in segment 47 of loop 45; transformer low voltage line 48 supplies electrical power and packetized data signals to thirty-three subscriber service units in segment 49 of loop 45, and transformer low voltage line 50 supplies electrical power and packetized data signals to thirty-three subscriber service units in segment 52 of loop 45. Each telephony exchange subscriber has a subscriber service unit (as shown in FIG. 4) connected to an outlet at the premises of the consumer for electrical power and transfer of packetized data signals. Loop 45 of FIG. 3 enables one hundred (100) subscriber service units to receive packetized data signals. Each segment (47, 49, 52) of the loop 45 is reactance coupled, by control access board 40, to enable providing electrical power from the local transformer to each one of those segments, while providing an interface between the transformer voltage level and the high frequency-low voltage level of the packetized data signals.

Additional components within a transformer service unit (TSU), shown within the interrupted line boundary 42 of FIG. 3, include power line modem 56 for sorting packetized data signals for individual designated subscriber service units (of segments 47, 49, 52 of loop 45); and CPU 58 for directing such packetized data signals.

Further, in FIG. 3, single chip transceiver unit 60 receives and sends packetized data signals, by means of a designated traffic path (A through J) as shown in FIG. 2, to operations center 10; single chip transceiver unit 62 receives and sends packetized data signals, in accordance with packet header information, to transformer service units for respective subscribers of remaining transformer/TSU combinations.

Certain individual components of the combination of FIG. 3 can be ordered for commercial manufacture to specifications of a particular telephony exchange of the invention, as follows:

TABLE II

| COMPONENT | MANUFACTURER |
|---|---|
| Control Access Board 40 | Telkonet, Inc.<br>Annapolis, MD 21401 |
| Power Line Modem 56 | Inari<br>Draper, Utah 84020, or<br>Intellon<br>Ocala, FL 34482 |
| CPU 58 | Intel Corp.<br>Santa Clara, CA 95052 |
| Single Chip Transceivers | Dallas Semiconductors<br>Dallas, TX 75244 |

Referring to FIG. 4, electrical power and packetized data signals are directed by power/signal line 70 to a subscriber served by a single transformer service unit (TSU) (which can comprise one hundred subscribers as described in relation to the embodiment of FIG. 3).

Referring to FIG. 4, the subscriber service unit (SSU) within the interrupted border line to 72 includes components for plain old telephone service (POTS) and digital phone service. As described above, each combined transformer/transformer service unit (TSU) can serve a plurality of subscribers. As indicated, each subscriber service unit, such as 72, includes a power line modem 74 which sorts packetized data signals for the subscriber of SSU 72, while ignoring packets for other subscriber service units which are served by the same designated TSU.

Central processing unit (CPU) 76 directs voice coded packetized digital signals (VOIP signals) to telephone chip 78; and, line 82 directs packetized data signals for digital signal phone or Internet use by computer 86 and/or for printing at printer 88. Telephone chip 78 is an integrated circuit (ASIC) containing a voice coder for processing plain old telephone service at phone 90.

Individual components selected for the subscriber service unit combination of FIG. 4 can be ordered for commercial manufacture to specifications for a particular power-line telephony exchange of the invention, as follows:

TABLE III

| COMPONENT | MANUFACTURER/ SUPPLIER |
|---|---|
| Power Line Modem 56 | Inari<br>Draper, Utah 84020<br>Intellon<br>Ocala, FL 34482 |
| CPU 76 | Intel Corp.<br>Santa Clara, CA 95052 |
| Telephone Chip 78<br>(vocoder) | Netergy Networks, Inc.<br>Santa Clara, CA 95054 |

While specific steps, components and uses for components have been set forth for purposes of describing the invention, it should be recognized that other specific method steps and components would be available, in the light of the above teachings, to those skilled in the art; therefore, for purposes of determining the scope of patent coverage of the present invention, reference shall be made to the appended claims, in combination with the above disclosure.

What is claimed is:

1. *A* method for providing hardwired telephony service, comprising the steps of:

(A) laying out a concentration of electrical power consumer premises selected from the group consisting of individual users and multiple-user apartment buildings, office buildings, and industrial complexes, with existing electrical power wiring;

(B) preparing a pattern, within the concentration of electrical power consumer premises, for estimating potential subscribers for telephony exchange service, by:

(i) determining [the] *a* number and location of transformers supplying consumers with electrical power within such concentration, (ii) determining [the] *a* number of such consumers supplied with electrical power by each respective transformer with electrical power consumers being located within a selected preferred radius of each such respective transformer;

(C) establishing an operations center, selectively located with relation to such concentration, for control of reception and re-transmitting of telecommunications for potential telephony exchange subscribers in such pattern;

(D) providing public-switched telephone access means and a worldwide Internet service provider at such operations center;

(E) extending a packetized data signal carrier, or predetermined capacity, from such operations center to a location for at least one electrical power transformer connected for delivery of transformer output by means of an electrical power line to respective consumers within such preferred radius, from such at least one transformer;

(F) electrically connecting a transformer service unit (*TSU*), for potential telephony exchange subscribers, to such transformer output by reactance coupling, so as to enable transferring both electrical power and packetized data signals, for such power and telephony exchange subscribers;

(G) sorting packetized data signals, being carried by such reactance coupled connection between such transformer and such TSU, for transfer on such existing electrical power wiring extending from such respective transformer unit to such power consumers and telephony exchange subscribers;

(H) installing a subscriber server means connected to a power outlet, at such electrical power consumer's premises, for receiving packetized data signals;

(I) converting packetized data signals for subscriber use selected from the group consisting of (i) plain old telephone communications, (ii) digital phone communications, and (iii) worldwide Internet communications.

2. The method of claim 1, *further* including extending such packetized data signal carrier to a plurality of sequential combinations of a power transformer, with a respective transformer service unit for sequentially sorting of packetized data signals, for telephony exchange subscribers receiving transformer output power from each such respective sequential power transformer for power line delivery with packetized data signals, to its respective TSU.

3. The method of claim 2, *further* including sorting such packetized data signals carrier supplied to at least one TSU, with remaining packetized data signals being directed to sequential TSU's for other subscriber server means.

4. The method of claim 2, [in which such] *wherein the* subscriber server means enables selecting from such group consisting of plain old telephone service, digital phone service, and worldwide Internet communication.

5. The method of claim 1, *further* including [the] *a* step of selecting from the group consisting of (a) end-user location within about a half-mile radius of each such respective transformer, and (b) adding a transponder/repeater for an end-user located at a distance greater than about one-half mile from such transformer.

6. [Apparatus] *An apparatus* for providing hardwired telephone services to a concentration of electrical power consumer premises selected from the group consisting of individual users and multiple-user apartment buildings, office buildings, and industrial complexes, with existing electrical power wiring, comprising (A) means for establishing an operations center, selectively located with relation to such concentration of electrical power consumers, for control of reception of telecommunications and re-transmitting for potential telephony exchange subscribers;

(B) means for providing public-switched telephone access means and a worldwide Internet service provider at such operations center;

(C) packetized data signal means extending from such operations center to a location for at least one electrical power transformer with power line for delivery of transformer output by means of an electrical power line to respective consumers within such preferred radius, from such at least one transformer;

(D) reactance means electrically connecting a transformer service unit (*TSU*), for potential telephony exchange subscribers, to such transformer so as to be capable of transferring both electrical power and packetized data signals for potential telephony exchange subscribers;

(E) means for sorting packetized data signals for transfer on such transformer power line to such electrical power consumers and telephony exchange subscribers;

(F) subscriber server means connected to a power outlet, at such electrical power consumer's premises, for receiving packetized data signals;

(G) means for converting packetized data signals for subscriber use selected from the group consisting of
(i) plain old telephone communications,
(ii) digital phone communications, and
(iii) worldwide Internet communications.

7. The apparatus of claim 6, further including *a* means for extending such packetized data signal carrier to a plurality of sequential combinations of a power transformer with a respective transformer service unit for sorting of packetized data signals, for delivery with electrical power, to subscribers of each transformer with its respective transformer service unit.

8. The apparatus of claim 7, further including means for sorting such packetized data signals supplied for at least one transformer service (*TSU*) unit electrical power to telephony exchange subscribers [(TSU)], with remaining packetized data signals being directed to sequential TSU's for other subscriber server means.

9. The apparatus of claim 7, *further* including means for enabling a subscriber to select from such group consisting of plain old telephone service, digital phone service, and worldwide Internet communication.

*10. The method of claim 1, further including*

*extending such packetized data signal carrier to a plurality of sequential combinations of a power transformer, with a respective transformer service unit for sequentially sorting of packetized data signals, for subscribers receiving transformer output power from each such respective sequential power transformer for power line delivery with packetized data signals, to its respective TSU.*

* * * * *